United States Patent [19]

Sragal

[11] 4,108,013
[45] Aug. 22, 1978

[54] CONSTANT TENSION APPARATUS FOR FLEXIBLE ENDLESS DRIVE MEANS

[76] Inventor: Richard F. Sragal, 1701 Westbrook, Madison Heights, Mich. 48071

[21] Appl. No.: 782,007

[22] Filed: Mar. 28, 1977

[51] Int. Cl.² ............................ F16H 7/12; F16H 7/10
[52] U.S. Cl. .................... 74/242.11 C; 74/242.11 R; 74/242.15 R
[58] Field of Search ............... 74/242.11 C, 242.11 R, 74/242.15 R, 242.8

[56] References Cited

U.S. PATENT DOCUMENTS

| 1,701,820 | 2/1929 | Morse | 74/242.11 C |
| 3,631,734 | 1/1972 | Wagner | 74/242.11 R |

Primary Examiner—Leonard H. Gerin
Attorney, Agent, or Firm—Robert G. Mentag

[57] ABSTRACT

A constant tension apparatus for use on continuous or endless drive members, such as continuous drive belts, chains and the like. A lever arm carries an idler roller at one end thereof which is adapted to engage the continuous drive belt, or the like. The lever is pivotally mounted on a support bracket which in turn is mounted on an engine or other machine which carries the continuous drive belt. A spring means is provided for normally biasing the lever in a direction to move the roller toward the belt to maintain a constant tension thereon. A spring biased wedge means is movably mounted on the support bracket for holding the lever arm in an adjusted position. The spring biases the lever arm against the belt automatically to maintain a constant tension on the belt as the belt stretches or loses its tension. The wedge means permits the lever arm to automatically move in one direction to maintain a constant tension on the belt, but it restricts movement of the lever arm in the opposite direction.

10 Claims, 6 Drawing Figures

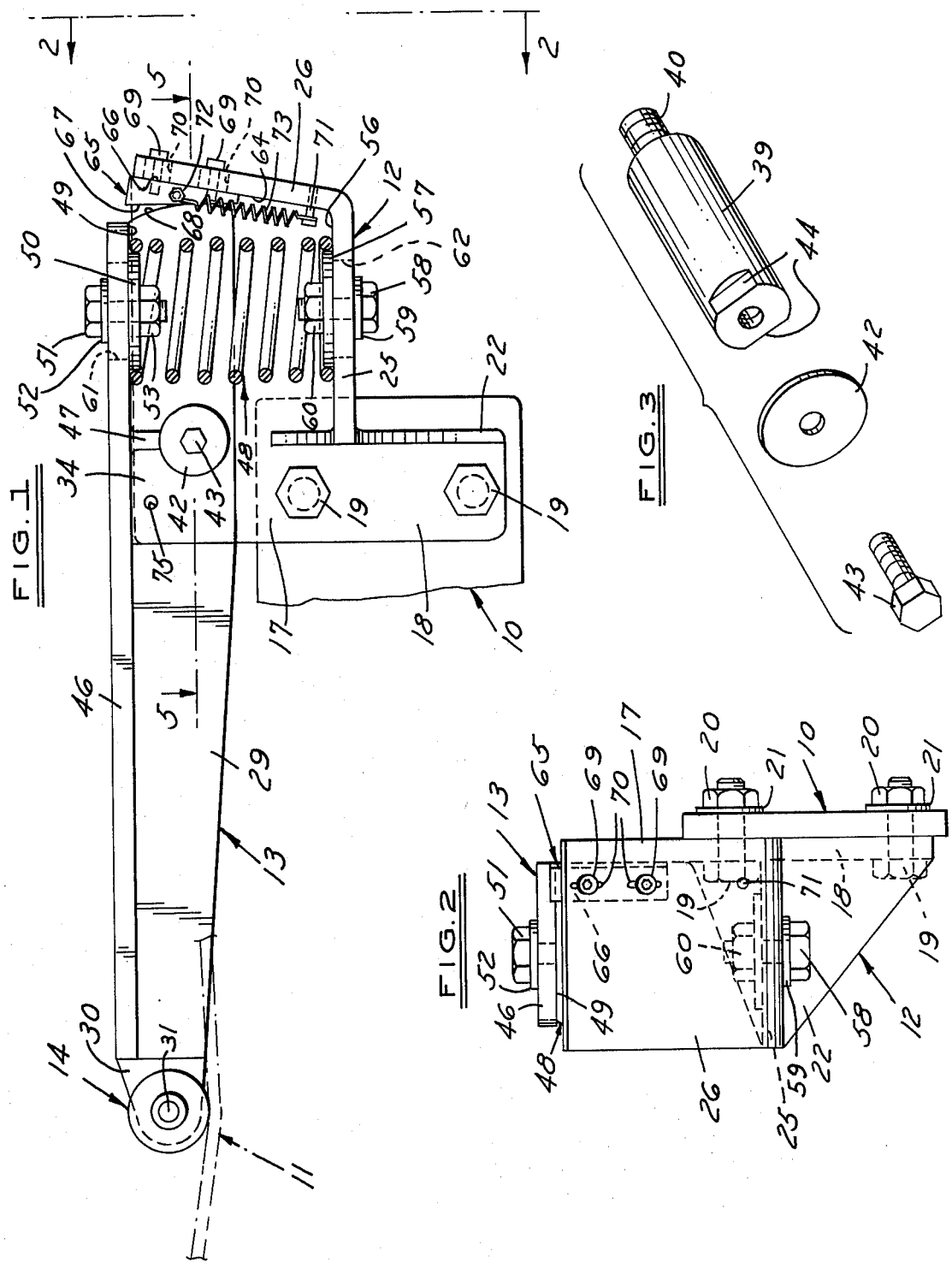

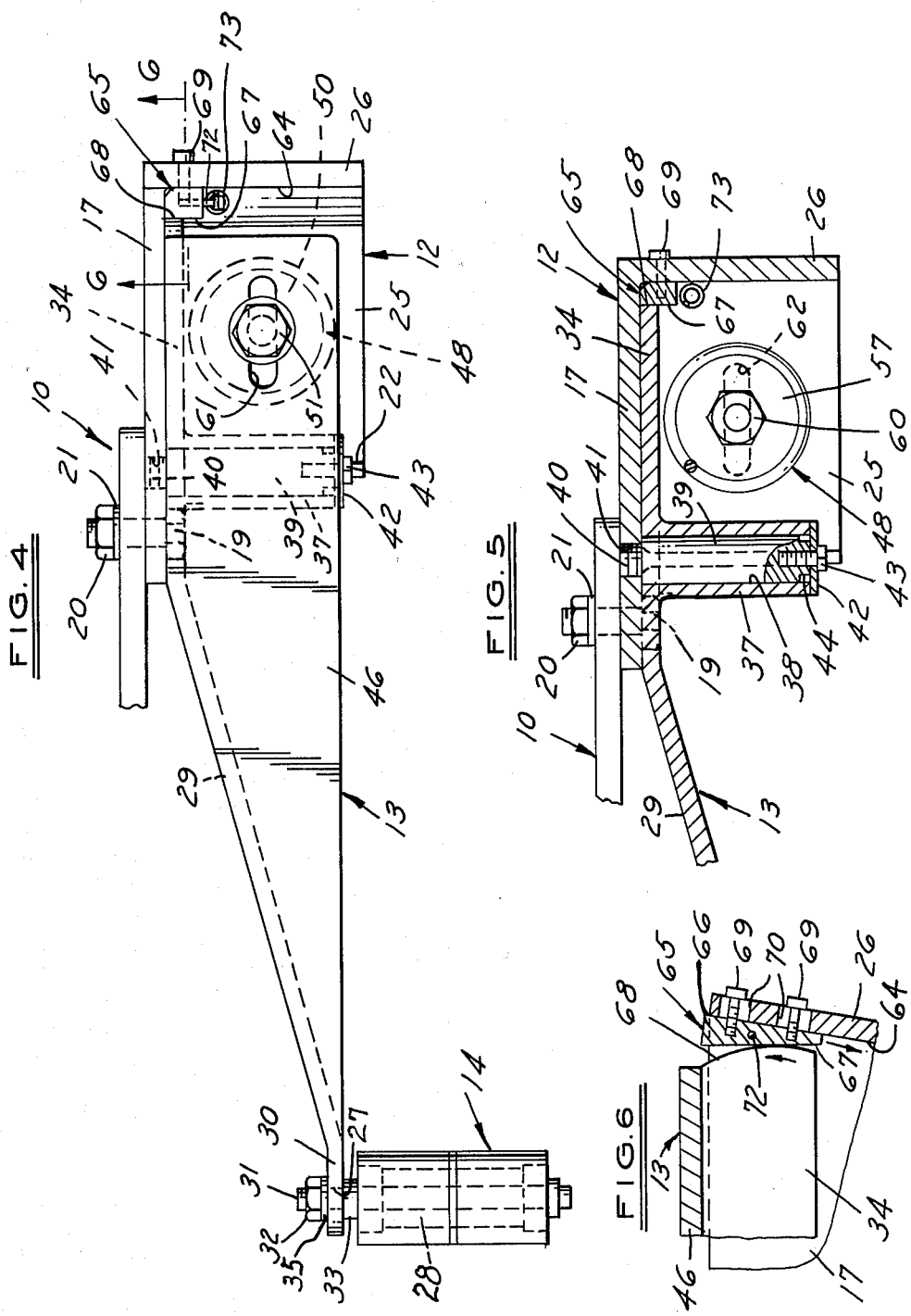

4,108,013

CONSTANT TENSION APPARATUS FOR FLEXIBLE ENDLESS DRIVE MEANS

SUMMARY OF THE INVENTION

This invention relates generally, to devices for tensioning continuous flexible drive means, such as chains or belts, and more particularly, to a constant tensioning apparatus for use on an internal combustion engine accessory drive belt.

At the present time, the automobile industry is attempting to provide a single drive belt for driving the accessories on an internal combustion engine such as the alternator, water pump, power steering pump, air pump and the like. A problem encountered in the use of such a continuous belt for driving a plurality of accessories on an internal combustion engine is that the belt goes into resonance and vibrates when the engine gets up to a certain speed, and the prior art belt tightening or tensioning devices have not been able to prevent such injurious action with its resultant tearing and destruction of the drive belt.

In view of the foregoing, it is the primary object of the present invention to provide a novel and improved constant tension device for endless drive belts, and the like which overcomes the aforementioned problem of the prior art belt tighteners and tensioning devices.

It is another object of the present invention to provide a constant tension apparatus for use on endless drive members such as drive belts and chains, and which includes a spring biased lever arm that is pivotally mounted on a support bracket, and which is provided with a non-return wedge means to hold the lever arm in an adjusted position, yet which permits the lever arm to automatically move to maintain the desired constant tension.

It is a further object of the present invention to provide a novel and improved constant tension apparatus for use on endless drive belts, chains and the like, and which is simple and compact in construction, economical to manufacture and efficient in operation.

It is a still further object of the present invention to provide a novel and improved constant tension apparatus for use on endless drive belts, chains and the like and which includes a support means, a lever arm pivotally mounted on said support means, a belt engagement member operatively mounted on one end of said lever arm, biasing means carried on said support means and engageable with said lever arm for normally moving the lever arm in one direction to maintain the belt engagement member on the belt with a constant desired tension, and a non-return means carried on a support means for preventing movement of the lever arm in the other direction to maintain the lever arm in operative engagement with the drive belt.

Other features and advantages of this invention will be apparent from the following detailed description, appended claims, and the accompanying drawings.

BRIEF DESCRIPTION OF THE DRAWINGS

FIG. 1 is a front elevation view of an illustrative embodiment of a constant tension apparatus made in accordance with the principles of the present invention.

FIG. 2 is a right side elevation view of the structure illustrated in FIG. 1, taken along the line 2—2 thereof, and looking in the direction of the arrows.

FIG. 3 is a sketch showing the lever mounting shaft structure in exploded form.

FIG. 4 is a top view of the structure illustrated in FIG. 1.

FIG. 5 is a fragmentary, horizontal section view of the structure illustrated in FIG. 1, taken along the line 5—5 thereof, and looking in the direction of the arrows.

FIG. 6 is a fragmentary, elevation section view of the structure illustrated in FIG. 4, taken along the line 6—6 thereof, and looking in the direction of the arrows.

DETAILED DESCRIPTION OF THE PREFERRED EMBODIMENT

Referring to FIG. 1, the numeral 10 generally designates a mounting plate on an internal combustion engine, or other type machine, which is provided with a belt 11 on which is applied a constant tension by the apparatus of the present invention. As shown in FIGS. 1 and 2, the constant tension apparatus of the present invention includes a support means in the form of a mounting bracket, generally indicated by the numeral 12, a spring biased lever arm, generally indicated by the numeral 13, and a belt tensioning idler, generally indicated by the numeral 14.

As shown in FIGS. 1 and 2, the support bracket 12 includes a vertical, rear plate-like wall 17 which has an integral lower extension portion 18. The bracket rear wall 17 and extension 18 are secured to the engine mounting plate by any suitable means, as by a pair of bolts 19, washers 21 and nuts 20. The support bracket 12 includes an integral, vertical stiffener rib 22 that extends perpendicularly forward from the rear vertical wall 17 and downward along the wall extension 18. The support bracket 12 further includes an integral, horizontal, longitudinal flange 25 that extends rearward from the stiffener rib 22 to the lower end of an integral side wall 26. The side wall 26 slopes upward and outward at an acute angle away from the outer end of the flange 25 of the rear wall 17.

As shown in FIGS. 1 and 4, the lever arm 13 includes a front vertical plate-like portion 29 which has an integral roller support front end portion 30 and an integral rear vertical plate-like portion 34. As shown in FIG. 4, the lever arm front end portion 30 is offset forwardly from the rear plate-like portion 34, but it is parallel therewith. The lever arm portion 29 is angled forwardly from the front end of the rear portion 34 to the rear end of the front end portion 30.

The idler roller 14 is supported by suitable bearing means 28 on a shaft 31. As shown in FIG. 4, a spacer sleeve 33 is mounted between the lever arm portion 30 and the roller 14. The shaft 31 is provided with a threaded end portion that is extended through a suitable bore 27 in the lever arm portion 30 and secured in place by a washer 35 and a suitable lock nut 32.

As shown in FIG. 5, a tubular pivot shaft 37 having a bore 38 is integrally formed on the outer face of the lever arm portion 34. A pivot dowel or shaft 39 has a reduced diameter, threaded shaft extension 40 that is mounted in a threaded hole 51 in the support bracket rear wall 17. The lever arm tubular pivot shaft 37 is pivotally mounted on the shaft 39 and is retained thereon by a retainer washer and suitable lock screw 43. As shown in FIG. 3, the pivot shaft 39 is provided on the outer end thereof with a pair of oppositely disposed wrench flats 44 for tightening said shaft in place.

As shown in FIGS. 1 and 4, the lever arm 13 includes an integral horizontal stiffener flange 46 which extends forwardly from the rear wall portions 39 and 34, and which terminates with its front edge parallel with the front edge of the front end 30 of the lever arm 13. As shown in FIG. 1, a vertical stiffener arm 47 is integrally formed below the flange 46.

A coil spring, generally indicated by the numeral 48, is mounted between the rear end of the lever 13 and the bracket flange 25 for creating a normal counterclockwise bias on the lever arm 13, as viewed in FIG. 1. The upper end of the spring 48 is seated against the inner side or face 49 of the lever arm flange 46. The upper end of the spring 48 is seated around a washer 50 which is retained in place by a suitable bolt 51, a washer 52 and a lock nut 53. The bolt 51 extends through a suitable slot 61 formed through the flange 46 to allow the bolt 51 to be adjusted lengthwise on the lever arm 13. The lower end of the spring 48 is seated on the top side 56 of the bracket flange 25. The lower end of the spring 48 is seated around a washer 57 which is secured in place on the flange 25 by a suitable bolt 58, a washer 59 and a lock nut 60. As shown in FIG. 1, a slot 62 is formed through the flange 25 to permit longitudinal adjustment of the bolt 58, as desired.

As shown in FIGS. 1, 4 and 6, a locking wedge, generally indicated by the numeral 65 is slidably mounted on the inner face 64 of the support bracket flange 26. The wedge 65 is provided with a straight rear face 66 which is slidably seated on the bracket flange surface 64. The wedge 65 is disposed with its longitudinal axis in alignment with the vertical axis through the convex rear end face 68 of the lever arm vertical plate 29. The wedge 65 has a tapered outer face 67 which tapers downwardly toward the bracket 26. The wedge 65 is held against the bracket 26 by a pair of retainer pins 69 which each have an integral head and which may be suitably secured to the wedge 65 by any suitable means, as by being pressed in place. The pins 69 extend through suitable elongated slots 70 formed through the bracket flange 26. As best seen in FIGS. 1 and 2, the slots 70 extend longitudinally of the longitudinal axis of the wedge 65. The outer face 67 of the wedge 65 engages the arcuate, convexly curved rear end face 68 of the lever arm plate 69 and it is normally biased downwardly into locking engagement with said lever arm slots 68 by a suitable spring 73. The upper end of the spring 73 is secured to the wedge 65 by a suitable retainer anchor pin 72 which is preferably press-fitted into a suitable hole in the outer side face of the wedge 65. The lower end of the spring 73 is secured to a suitable anchor pin 71 which is preferably press-fitted into a suitable hole in the inner face of the bracket flange 26.

As shown in FIG. 1, a hole 75 is formed through both the lever arm plate body 29 and the mounting plate 10 for retaining the lever arm 13 against movement relative to the bracket 12 during a mounting operation of the constant tension apparatus on an engine in an operative position.

In use, the constant tension apparatus would be secured to a mounting plate 10 on an engine or the like by means of the bolts 19, or other suitable means. After mounting on the plate 10, the wedge 65 is moved upwardly to a released position and the pin or other member inserted through the hole 75 is withdrawn to allow the lever arm 29 to be moved counterclockwise to bring the roller 14 into operative engagement with the belt 11. It will be seen that the spring 49 then functions to move the lever arm 13 counterclockwise into a constant tension position to maintain a tension on the belt 11 in accordance with the size of the spring 48 employed in the apparatus. The wedge 65 is then permitted to be moved downwardly by the spring 73 into locking engagement against the lever arm rear end 68. It will be seen that as the belt 11 wears through use and loses its tension, the lever arm 13 is free to be rotated counterclockwise by the spring 48 to maintain the desired constant tension. The movement of the lever arm 29 is not restricted into a counterclockwise direction by the wedge 65, but the wedge 65 functions to restrain the lever arm 13 from rotating clockwise so as to release the tension on the belt 11. It will be seen that the spring 73 automatically moves the wedge 65 downwardly into a gripping and retaining engagement with the rear end 68 of the lever arm 13 after each automatic adjustment of the lever arm 13 to maintain constant tension on the belt 11. It will be understood that the constant tension apparatus of the present invention may also be used for maintaining a constant tension on other continuous drive means, such as continuous drive chains, and the like.

While it will be apparent that the preferred embodiments of the invention herein disclosed are well calculated to fulfill the objects above stated, it will be appreciated that the invention is susceptible to modification, variation and change.

What I claimed is:

1. In a constant tension apparatus for flexible endless drive belts, the combination comprising:
    (a) a support means;
    (b) a lever arm pivotally mounted on said support means;
    (c) a belt engagement member operatively mounted on said lever arm;
    (d) biasing means carried on said support means and engageable with said lever arm for normally moving the lever arm in one direction to maintain the belt engagement member on the belt with a constant tension; and,
    (e) a continuous engagement non-return means carried on the support means and engagable with the lever arm for preventing movement of the lever arm in the other direction to maintain the lever arm in operative engagement with the drive belt.

2. A constant tension apparatus as defined in claim 1, wherein:
    (a) said biasing means is a spring means.

3. In a constant tension apparatus for flexible endless drive belts, the combination comprising:
    (a) a support means;
    (b) a lever arm pivotally mounted on said support means;
    (c) a belt engagement member operatively mounted on said lever arm;
    (d) biasing means carried on said support means and engagable with said lever arm for normally moving the lever arm in one direction to maintain the belt engagement member on the belt with a constant tension; and
    (e) a non-return means carried on the support means for preventing movement of the lever arm in the other direction to maintain the lever arm in operative engagement with the drive belt and comprising,
       (1) a wedge means movably mounted on said support means; and,
       (2) a biasing means for biasing the wedge means into unidirectional holding engagement with the lever arm.

4. A constant tension apparatus as defined in claim 3, wherein:

(a) said wedge biasing means is a spring means.

5. A constant tension apparatus as defined in claim 4, wherein:
    (a) the wedge means engages one end of the lever arm.

6. A constant tension apparatus as defined in claim 5, wherein:
    (a) the end of the lever arm engaged by the wedge means is arcuately shaped.

7. A constant tension apparatus as defined in claim 6, wherein:
    (a) the belt engagement member is mounted on the other end of the lever arm.

8. A constant tension apparatus as defined in claim 7, wherein:
    (a) said wedge means has a tapered face engageable in a unidirectional friction grip with the arcuately shaped end of the lever arm.

9. A constant tension apparatus as defined in claim 8, wherein said belt engagement member comprises:
    (a) a roller mounted on said other end of the lever arm.

10. A constant tension apparatus as defined in claim 8, wherein:
    (a) the spring means for biasing the lever arm is disposed adjacent the arcuately shaped end of the lever arm.

* * * * *